US009749504B2

United States Patent
Labrozzi et al.

(10) Patent No.: US 9,749,504 B2
(45) Date of Patent: Aug. 29, 2017

(54) OPTIMIZING TIMED TEXT GENERATION FOR LIVE CLOSED CAPTIONS AND SUBTITLES

(71) Applicant: CISCO TECHNOLOGY, INC., San Jose, CA (US)

(72) Inventors: Scott C. Labrozzi, Cary, NC (US); James Christopher Akers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 655 days.

(21) Appl. No.: 13/628,024

(22) Filed: Sep. 26, 2012

(65) Prior Publication Data

US 2013/0076981 A1 Mar. 28, 2013

Related U.S. Application Data

(60) Provisional application No. 61/539,802, filed on Sep. 27, 2011.

(51) Int. Cl.
*G06F 17/00* (2006.01)
*H04N 5/04* (2006.01)
*H04N 5/445* (2011.01)
*H04N 21/488* (2011.01)

(52) U.S. Cl.
CPC ........... *H04N 5/04* (2013.01); *H04N 5/44513* (2013.01); *H04N 21/4884* (2013.01); *H04N 2005/44526* (2013.01)

(58) Field of Classification Search
CPC ......... G06F 17/24; G06F 17/211; H04N 5/04; H04N 5/44513; H04N 21/4884
See application file for complete search history.

(56) References Cited

U.S. PATENT DOCUMENTS

| | | | |
|---|---|---|---|
| 8,345,159 B2 * | 1/2013 | Polumbus et al. | 348/468 |
| 2003/0035063 A1 * | 2/2003 | Orr | 348/465 |
| 2008/0129864 A1 * | 6/2008 | Stone et al. | 348/468 |
| 2008/0279535 A1 * | 11/2008 | Haque et al. | 386/95 |

(Continued)

OTHER PUBLICATIONS

"Closed Captioning" from Wikipedia, Aug. 10, 2012, 14 pages; http://www.en.wikipedia.org/w/index.php?title=Closed_Captioning&oldid=506728533.

(Continued)

*Primary Examiner* — Stephen Hong
*Assistant Examiner* — Marshon Robinson
(74) *Attorney, Agent, or Firm* — Merchant & Gould P.C.

(57) ABSTRACT

A method is provided in certain example embodiments, and may include receiving source timed text data and an associated time stamp, and rendering a representation of the received source timed text data within a textual array. The textual array includes at least one row having textual data associated with the received source timed text data contained therein. The method may further include producing at least one data document including row data associated with one or more rows of the textual array when the textual data of the at least one row has changed from a previously rendered on-screen representation of previously received source timed text data. The row data includes a change in textual data for one or more rows from a previously produced caption data document.

17 Claims, 9 Drawing Sheets

(56) References Cited

U.S. PATENT DOCUMENTS

| | | | | |
|---|---|---|---|---|
| 2010/0007799 A1* | 1/2010 | Ohno | ............... | H04N 5/04 348/649 |
| 2010/0175026 A1* | 7/2010 | Bortner | ............... | G06F 3/0481 715/818 |
| 2010/0211636 A1* | 8/2010 | Starkenburg | ....... | H04N 7/17318 709/203 |
| 2010/0287481 A1* | 11/2010 | Sawada | ............... | G06Q 10/109 715/751 |
| 2012/0317493 A1* | 12/2012 | Vilke | ............... | G06F 3/01 715/738 |
| 2013/0216202 A1* | 8/2013 | Palakshamurthy et al. | .. | 386/241 |

OTHER PUBLICATIONS

"MPEG-4 Part 17," from Wikipedia, Jan. 13, 2012, 2 pages; http://www.en.wikipedia.org/wiki/MPEG-4_Part17 &oldid=469259980.

"Timed Text," from Wikipedia, Aug. 22, 2012, 3 pages; http://www.en.wikipedia.org/w/index.php?title=Timed_Text &oldid=508604982.

* cited by examiner

OPTIMIZING TIMED TEXT GENERATION FOR LIVE CLOSED CAPTIONS AND SUBTITLES

CROSS-REFERENCE TO RELATED APPLICATIONS

This Application claims the benefit of priority under 35 U.S.C. §119(e) to U.S. Provisional Patent Application Ser. No. 61/539,802 filed on Sep. 27, 2011 and entitled "Optimizing TTML Generation for Live Closed Captions and Subtitles," which is hereby incorporated by reference in its entirety.

TECHNICAL FIELD

The present disclosure relates to communications and, more particularly, to optimizing timed text generation for live closed captions and subtitles.

BACKGROUND

Closed captioning or subtitling is the process of displaying text on a television, video screen or other visual display to provide additional or interpretive information to individuals who wish to access it. Closed captions typically show a transcription of the audio portion of a program as it occurs (either verbatim or in edited form), sometimes including non-speech elements. For live programs, spoken words comprising the television program's soundtrack are typically transcribed by a human operator (a speech-to-text reporter) using stenotype or stenomask type machines, whose phonetic output is translated into text by a computer and displayed on the screen. In some cases, a transcript is available beforehand and captions are simply displayed during the program after being edited. For programs that have a mix of pre-prepared and live content, such as news bulletins, a combination of the above techniques may be used. For prerecorded programs, commercials, and home videos, audio is often transcribed and captions are prepared, positioned, and timed in advance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
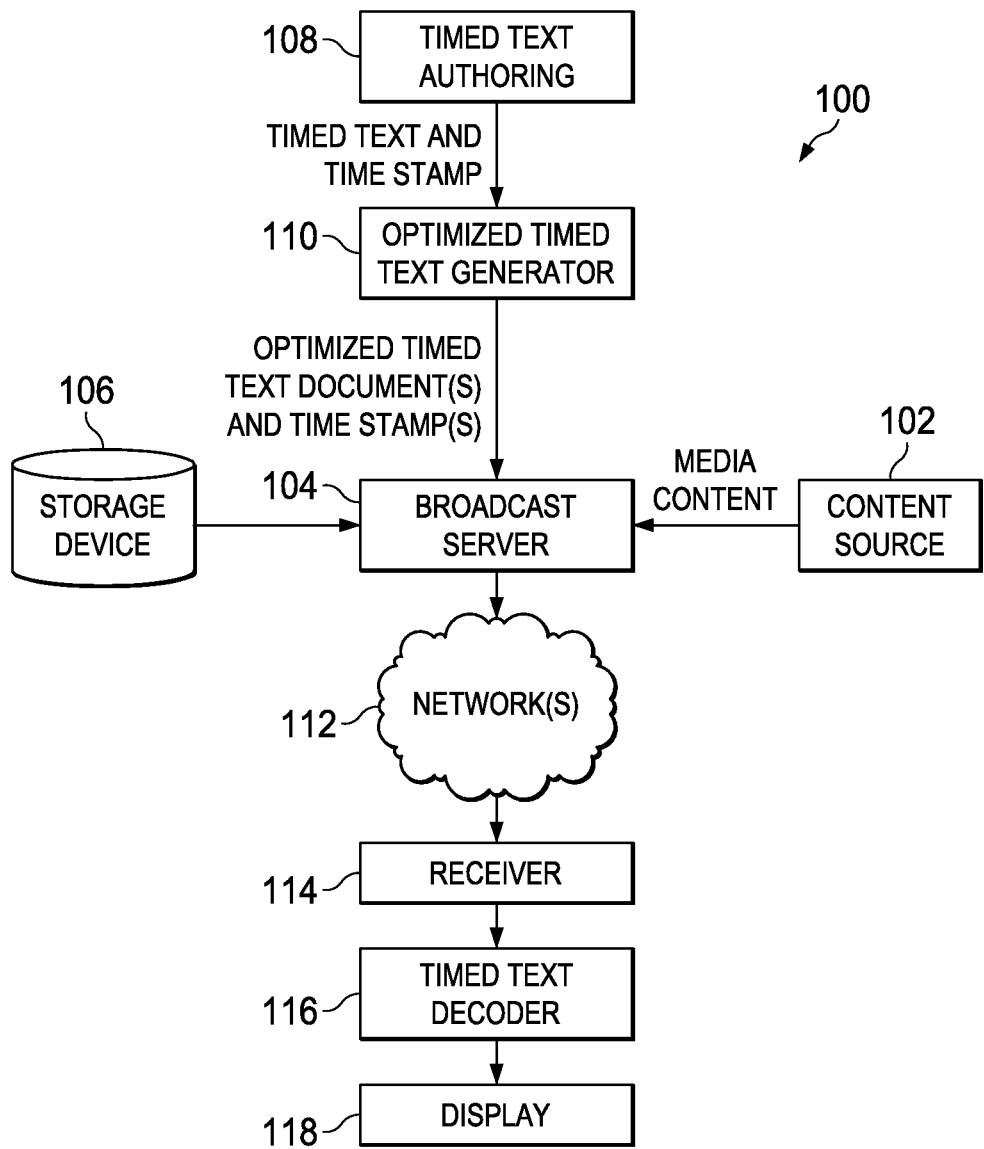
FIG. 1 is a simplified block diagram illustrating a communication system that may be configured for providing optimized timed text with media content in a network environment.

A method is provided in certain example embodiments, and may include receiving source timed text data and an associated time stamp, and rendering an on-screen representation of the received source timed text data within a textual array. The textual array includes at least one row having textual data associated with the received source timed text data contained therein. The method may further include producing at least one data document including row data associated with one or more rows of the textual array when the textual data of the at least one row has changed from a previously rendered on-screen representation of previously received source timed text data. The row data includes a change in textual data for one or more rows from a previously produced caption data document.

In specific implementations, the method may include receiving source timed text data and an associated time stamp, rendering an on-screen (or off-screen) representation of the received source timed text data within a textual array. The textual array includes at least one row having textual data associated with the received source timed text data contained therein. The method may further includes producing at least one data document including row data associated with one or more rows of the textual array when the textual data of the at least one row has changed from a previously rendered on-screen representation of previously received source timed text data. The row data includes a change in textual data for one or more rows from a previously produced caption data document.

Additionally, the method may include creating at least one display element from the row data of the at least one data document in which the at least one display element includes one or more display element rows containing textual data from the row data of the caption data document and an associated display time. The method may further include assigning a row identifier for each row of the at least one display element.

In other specific implementations, creating the at least one display element includes copying textual data from a previous display element to the at least one display element when a command field of the at least one data document is not indicative of either a screen update or a screen erase. In other specific implementations, the row identifier is the same as a row identifier of a previous display element when textual data of the row of the at least one display element matches textual data of a corresponding row of the previous display element.

Additionally, the method may include generating a markup language document from the at least one display element in which the markup language document includes the textual data of the display element rows having display times within a predetermined time. In some specific implementations, the predetermined time is between a time identified by the time stamp and a predetermined time offset value. In some specific implementations, the markup language document includes textual data only of rows having a row identifier that has not previously been outputting during the predetermined time.

Example Embodiments

Turning to FIG. 1, FIG. 1 is a simplified block diagram illustrating a communication system 100 that may be configured for providing optimized timed text with media content in a network environment. In this particular implementation of FIG. 1, communication system 100 includes a content source 102 in communication with a broadcast server 104. Broadcast server 104 is in further communication with a storage device 106. Communication system 100 further includes a timed text authoring device 108 in communication with an optimized timed text generator device 110. Optimized timed text generator device 110 is in further communication with one or more network(s) 112. Network(s) 112 are in further communication with a receiver 114. Receiver 114 is coupled to a timed text decoder 116. The timed text decoder is in further communication with a display device 118.

For purposes of illustrating certain example techniques of communication system 100, it is important to understand the communications that may be traversing the network. The following foundational information may be viewed as a basis from which the present disclosure may be properly explained. Timed Text refers to the presentation of text media in synchrony with other media, such as audio and/or video. Examples uses of timed text include presenting closed captioning or subtitling text in synchrony with a video presentation. Closed captioning is the process of displaying text on a television, video screen or other visual display to provide additional or interpretive information to individuals who wish to access it. Closed captions typically show a transcription of the audio portion of a program as it occurs (either verbatim or in edited form), sometimes including non-speech elements. Subtitles are textual versions of the dialog in films, television programs and other media, usually displayed at the bottom of the screen. Typically, subtitles may be a form of written translation of a dialog in a foreign language, or a written rendering of the dialog in the same language and may include added information to help viewers who are deaf and hard-of-hearing to follow the dialog. Subtitles may also help people who cannot understand the spoken dialogue or who have accent recognition problems. Typically, closed captions and subtitles may be selectively enabled by the viewer.

Closed captions and subtitles were originally applied to traditional analog video formatted presentations. With the advent of new digital audio and video formats, new techniques have been developed to include timed text with these digital presentations. Various new video formats have adopted the Timed Text Markup Language (TTML) specification (or the WebVTT specification) from the W3C Organization for the delivery of captions and subtitles. Formats such as the Timed Text Markup Language (TTML) and WebVTT provide a standardized representation of a particular subset of textual information with which stylistic, layout, and timing semantics are associated by an author or an authoring system for the purpose of interchange and potential presentation.

In traditional media for displaying subtitling and closed captioning text there are three typically-used authoring methods by which text is flowed onto the viewing area to maximize readability and viewer comprehension. These authoring methods include paint-on, pop-on and roll-up. Pop-on captions typically "pop on" and off the screen in synchronization with a program's audio. They are typically one or two lines of text that appear onscreen and remain visible for one to several seconds before they disappear. Pop-on captions are typically carefully placed on the screen to indicate the speaker, and include descriptions of music and sound effects. Roll-up captions typically feature 2 to 4 lines of text that "roll up" on the screen one line at a time. As each new line rolls up, the top line disappears allowing the continuous rolling up of captions. With paint-on captions individual letters are "painted on" one at a time from left to right, not popped on with all at once. Paint-on captions typically roll up when a captioner hits a return.

Some formats such as TTML do define a grammar that allows the implementation of these three methods, whereas other formats such as WebVTT lack the grammar to describe these methods. However, these formats do not define encoder methods for conversion of source live captioning or subtitling to the format's textual representations. Additionally, various client implementations of these formats do not include the full grammar, specifically no paint-on or roll-up support. Because subtitling and closed captioning continues to be authored for traditional broadcast television, the closed captioning or subtitling presented by such clients may not accurately reflect the originally authored presentation. Finally, these formats can be heavy on data rate. If the generation of the format representation is not optimally compacted, the results can be impractical for low data rate transmissions.

Various embodiments described herein addresses the conversion of source captions and subtitles to representations such as TTML/WebVTT such that it 1) preserves the source authoring methods to more accurately reflect how the textual data was originally authored without requiring client-side implementations of such methods as paint-on or roll-up; and 2) optimally compacts the output data so that the textual data can be optimally packed within the data stream.

Referring again to FIG. 1, and in the context of an example operation of communication system 100, content source 102 can provide media content to broadcast server 104, and broadcast server 104 stores the media content in storage device 106. In at least one embodiment, the media content is a video/audio presentation such as a television program or movie. Timed text authorizing device 108 generates timed text associated with the media content. The timed text may include, for example, closed captions or subtitles associated with the media content. Timed text authoring device 108 provides the timed text and a time stamp associated with the timed text to optimized timed text generator 110. In at least one embodiment, the time stamp associated with the timed text corresponds to a time line that is common to both the timed text and the associated the media presentation. In still other embodiments, the time stamp associated with the timed text may be independent of a timeline associated with the media content.

Optimized timed text generator device 110 receives the timed text and associated time stamp and produces an optimized timed text document and time stamp representative of the received time text and time stamp as will be further described herein. In at least one embodiment, the process of optimizing timed text generation such as for live closed captions and subtitles is broken into three phases. In the first phase of processing, source caption/subtitle data is processed to produce a caption data document describing what is visually represented on screen. The caption data document is provided to a second phase of processing which optimizes a relationship in time and position of one or more caption data documents. The third phase of processing generates a timed text document, such as a TTML document, based on this optimization. Further details of example operations of the first, second, and third phases are discussed further hereinbelow. The optimized timed text generator 110 outputs the optimized timed text document(s) and time stamp(s) to broadcast server 104, and broadcast server 104 stores this data in storage device 106.

At a time of broadcast or delivery of the media content to a viewer, broadcast server 104 retrieves the optimized timed text document(s) and associated time stamp(s) as well as the media content and transmits them to network(s) 112. In at least one embodiment, the media content and optimized timed text documents and associated time stamps are combined into a single data stream. In still other embodiments, the media content and optimized timed text documents and associated time stamps are transmitted in separate data streams. Receiver 114 receives the media content and optimized timed text documents with associated time stamps from network(s) 112. The receiver 112 decodes the media content and passes the optimized timed text documents with associated time stamps to timed text decoder 116. Timed text decoder 116 decodes the optimized timed text documents and time stamps. Display device 118 receives the decoded media content and decoded timed text and presents the timed text in synchrony with the media content.

Figure 2:
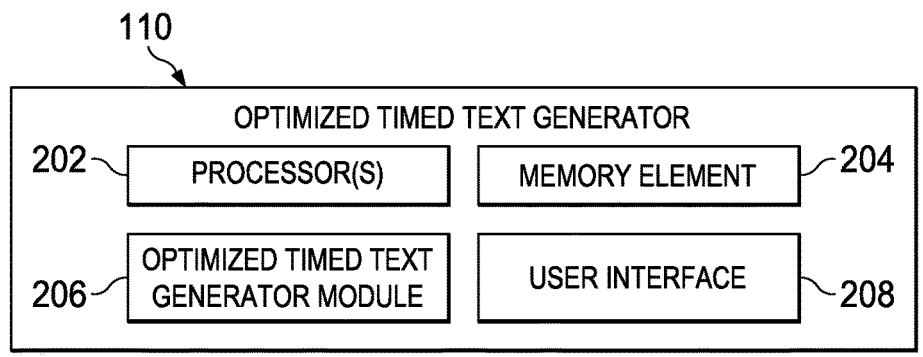
FIG. 2 illustrates an optimized timed text generator device according to one embodiment.

Referring now to FIG. 2, FIG. 2 illustrates an optimized timed text generator device 110 according to one embodiment. Optimized timed text generator device 110 includes one or more processor(s) 202, a memory element 204, an optimized timed text generator module 206, and a user interface module 208. Processor(s) 202 is configured to execute various tasks of optimized timed text generator 110 as described herein and memory element 204 is configured to store data associated with switch. Optimized timed text generator module 206 is configured to implement the various functions of timed text processing and generation as further described herein. User interface module 208 is configured to provide a user interface to allow a user to enabled one or more options provided by optimized timed text generator module 206 as will be further described herein.

In one implementation, optimized timed text generator device 110 is a network element that includes software to achieve (or to foster) the optimized timed text generation operations, as outlined herein in this Specification. Note that in one example, each of these elements can have an internal structure (e.g., a processor, a memory element, etc.) to facilitate some of the operations described herein. In other embodiments, these timed text generation operations may be executed externally to this element, or included in some other network element to achieve this intended functionality. Alternatively, optimized timed text generator device 110 may include software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 3:
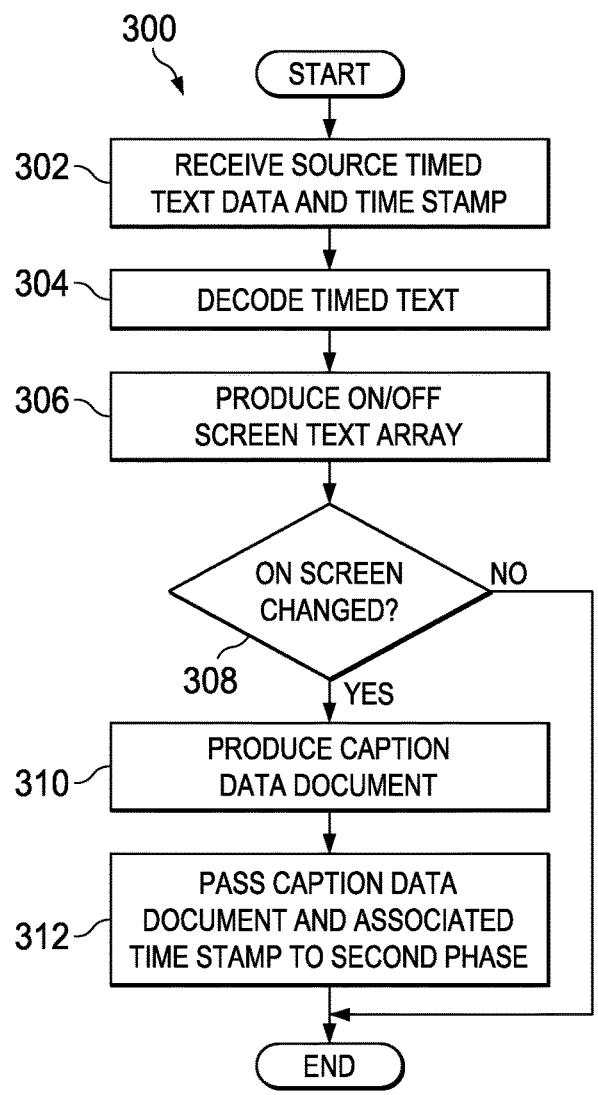
FIG. 3 is a simplified flowchart illustrating example operations of producing a caption data document from timed text data in accordance with various embodiments.

Referring now to FIG. 3, FIG. 3 is a simplified flowchart 300 illustrating example operations of producing a caption data document from timed text data in accordance with various embodiments. In 302, a sample of source timed text data and an associated time stamp is received for processing by optimized timed text generator device 110. The source timed text data may include source caption/subtitle data associated with media content. Source caption/subtitle data is often associated with a video frame. For example, it is often embedded in the Vertical Ancillary Data Space (VANC) area (Line-21 CC, Teletext Subtitles, etc) of a digital video transmission or contained in the user data of compressed video frames. They may also be carried out of band of the video signal. For example, DVB-Teletext Subtitles are broadcasted in a separate stream than the video images. In either case, the source data is provided at discrete points of time and thus have an associated time stamp. The source timed text data contains information including the text and commands regarding how the visual representation of the display to be updated. For example, the source timed text data may indicate to place a character at a particular place on or off screen, roll-up a set of lines of text, swap off and on screen representations, clear the display, etc. In particular embodiments, the source timed text data includes caption/subtitling data with an associated time stamp arrives for processing.

In 304, the timed text is decoded to produce the textual data as if it is to be rendered to a screen. In various embodiments, the source timed text data is encoded by code symbols. Decoding of the encoded source timed text data produces the actual text and commands used to update the visual presentation. In 306, an on-screen textual array and an off-screen textual array are produced from the decoded timed text data. Each textual array represents rows and character locations within each row mapped to a screen display. The on-screen textual array represents text that should be currently overlaid on the video, and the off-screen textual array represents text that should not be currently visible in the display. Captioning and subtitling formats have at their core the concept that a letter or character is mapped to a particular row and column on the screen. To better understand the use of on-screen and off-screen textual arrays, the nature of the transmission of certain types of timed text such as closed captioning is further described. In a typical closed captioning implementation, only two characters are delivered per frame. Accordingly, a whole word or sentence cannot be delivered in one video frame but instead should be delivered using multiple video frames. The on-screen textual array represents what should be currently displayed on the screen and the off-screen textual array functions as a form of "scratch pad" for received characters. For example, for pop-on captions the characters of the caption text are delivered in pairs over subsequent frames and painted to the off-screen textual array. A command is then received within the closed caption data to switch the off-screen and on-screen textual arrays. At this time, the off-screen textual array becomes the on-screen textual array to be displayed, and the on-screen textual array becomes the off-screen textual array. The visual representation of such a procedure is that all of the text of the on-screen array pops on the screen at a sudden. Depending on how a particular caption has been encoded, the characters of the caption may be rendered directly to the on-screen textual array in which case they are immediately displayed on the primary display screen. An example of such a case is when paint-on captioning is in use. Other captions, such as for video on demand (VOD), are rendered to the off-screen textual array first and then later "pop-on" to the primary display screen.

Figure 4:
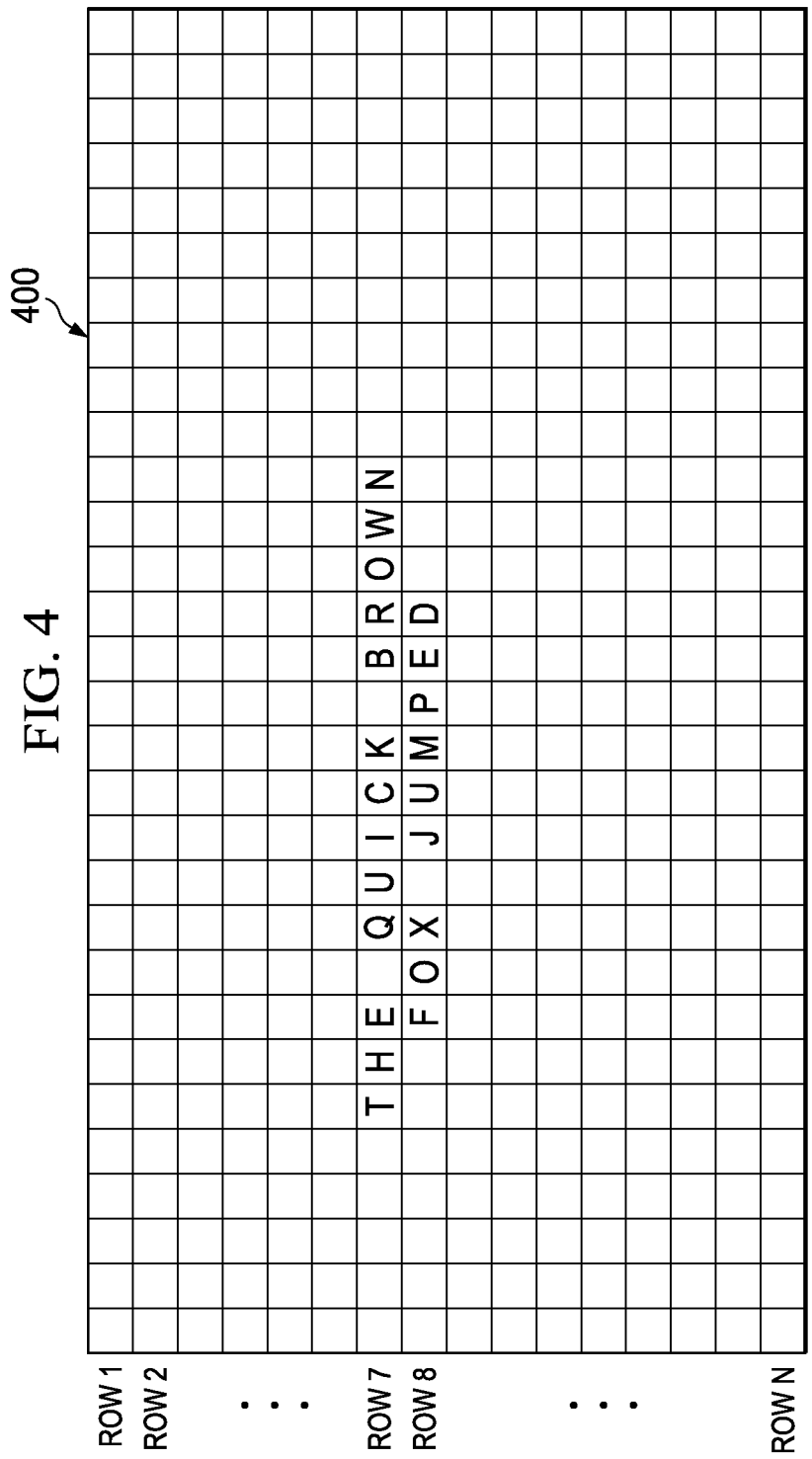
FIG. 4 illustrates an example of a textual array according to a particular embodiment.

FIG. 4 illustrates an example of a textual array 400 according to a particular embodiment. The textual array 400 includes a number of rows and character locations within each row with each row identified by a row label Row 1-Row N. In the particular example illustrated in FIG. 4, Row 7 includes the text "The quick brown" beginning at column 6. Row 8 includes the text "fox jumped" beginning at column 8.

Referring again to FIG. 3, the producing of the on-screen textual array and off-screen textual array includes rendering decoded textual data that is intended for immediate on-screen display to the on-screen textual array, and rendering textual data is intended for the off-screen "scratch pad" for later display to the off-screen textual array.

In 308, it is determined whether the text of the on-screen textual array has changed from the text of last rendered on-screen textual array. Source data may not change the on-screen visual representation for a particular sample of data. For example, NULLs in the caption data stream indicate that there is no change in the caption data. If the on-screen representation has not changed, processing of the first phase ends for this particular sample of source timed text data. If the on-screen representation has changed, the procedure continues to 310. In 310, a caption data document is produced. The caption data document contains caption data that describes the current visual presentation on the screen. In a particular embodiment, the caption data includes a command field indicating an update status of the screen and row data including the textual data associated with one or more rows within the textual array.

Figure 5:
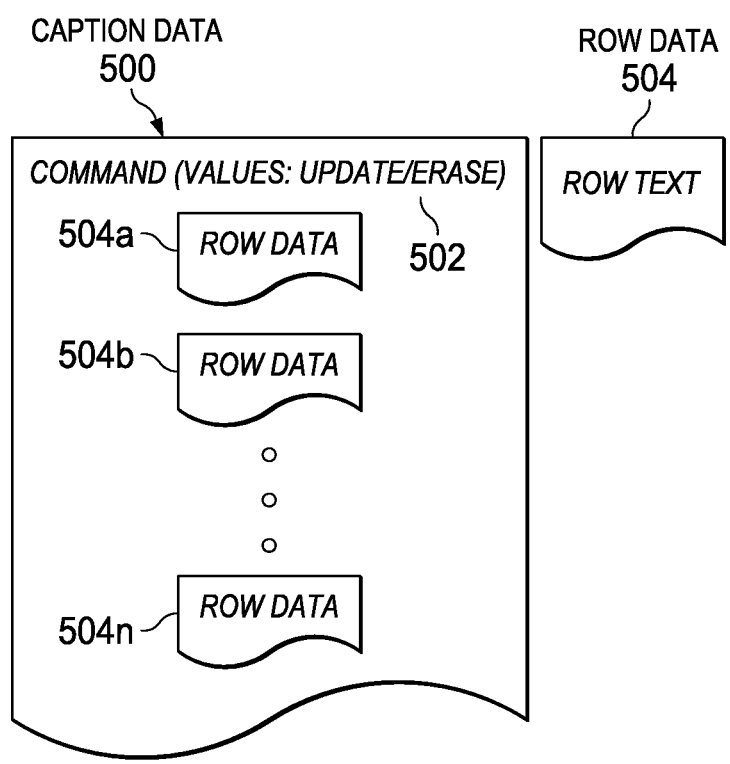
FIG. 5 illustrates an example of a caption data document according to a particular embodiment.

Referring now to FIG. 5, FIG. 5 illustrates an example of a caption data document 500 according to a particular embodiment. The caption data document 500 contains a Command field 502 which includes a command that can be used to indicate that current status of the on-screen representation. In a particular embodiment, the Command field 502 may include values of either "Update" or "Erase" for the current status of the on-screen representation. The Update command indicates that the on-screen representation has been updated since the last time a caption data document was produced. The Erase command indicates that the on-screen representation has been cleared, i.e. nothing appears on-screen. The caption data document 500 further includes caption data that contains a list of Row Data 504a-504n, each of which enumerates what row is being described and the change in text for that row since the last caption data document 500 was produced. Each of the Row Data 504 includes a Row field indicating the particular row and a Text field indicating the text of that row. It should be understood in the particular embodiment illustrated in FIG. 5 that the Row Data 504a-504n contains the entire updated line of text and not just a delta of changes since the last update of that line.

Figure 7:
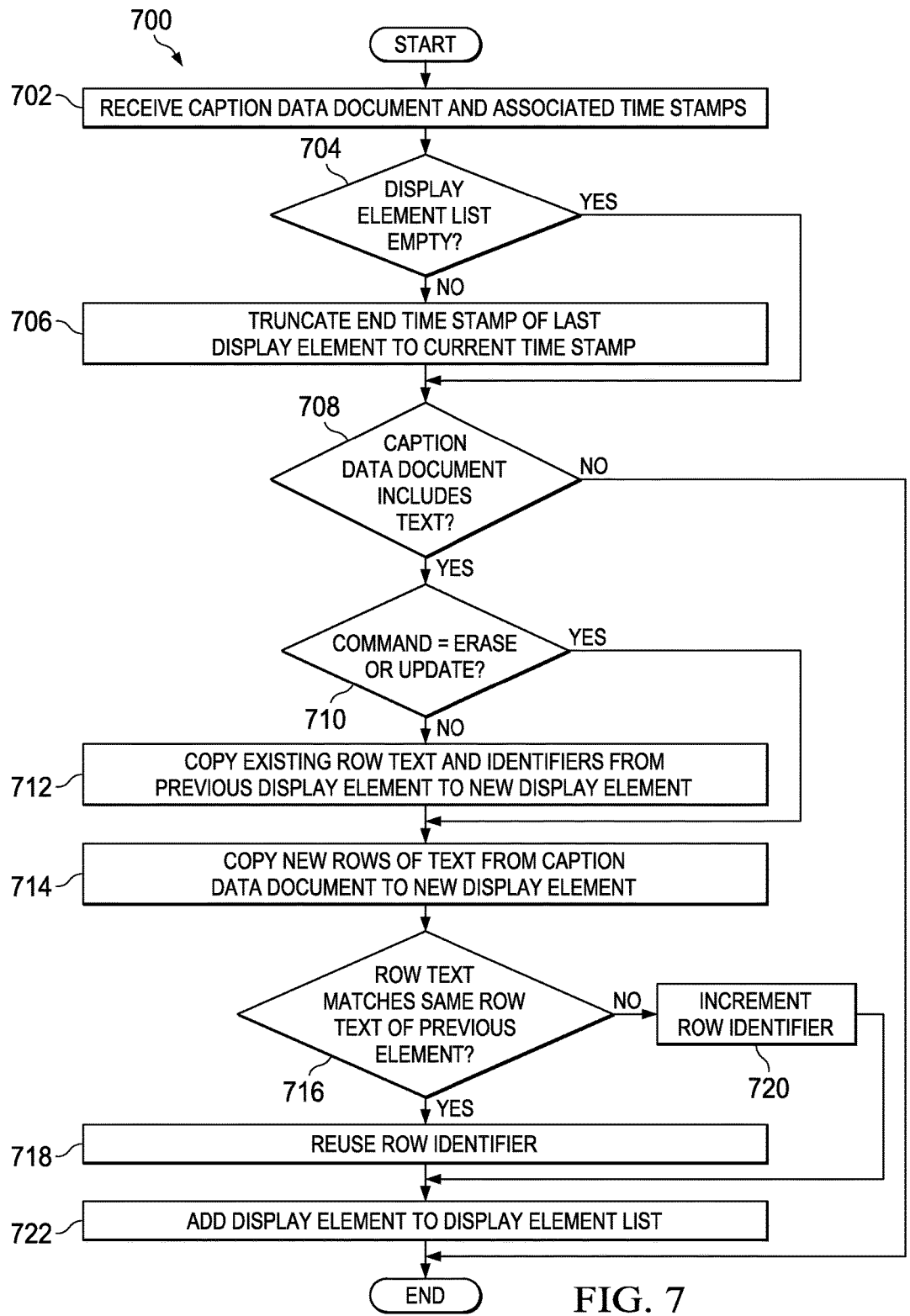
FIG. 7 is a simplified flowchart illustrating example operations of generating an optimized list of display elements from one or more caption data documents in accordance with a second processing phase of various embodiments.

Referring again to FIG. 3, in 312 the produced caption data document and its associated time stamp is passed to second phase of processing in which an optimized list of display elements is created from one or more caption data documents generated by the first phase as will be further described herein with respect to FIG. 7. In various embodiments, the procedure of FIG. 3 is repeated for every sample of source timed text data and associated time stamp that is received.

Figure 6:
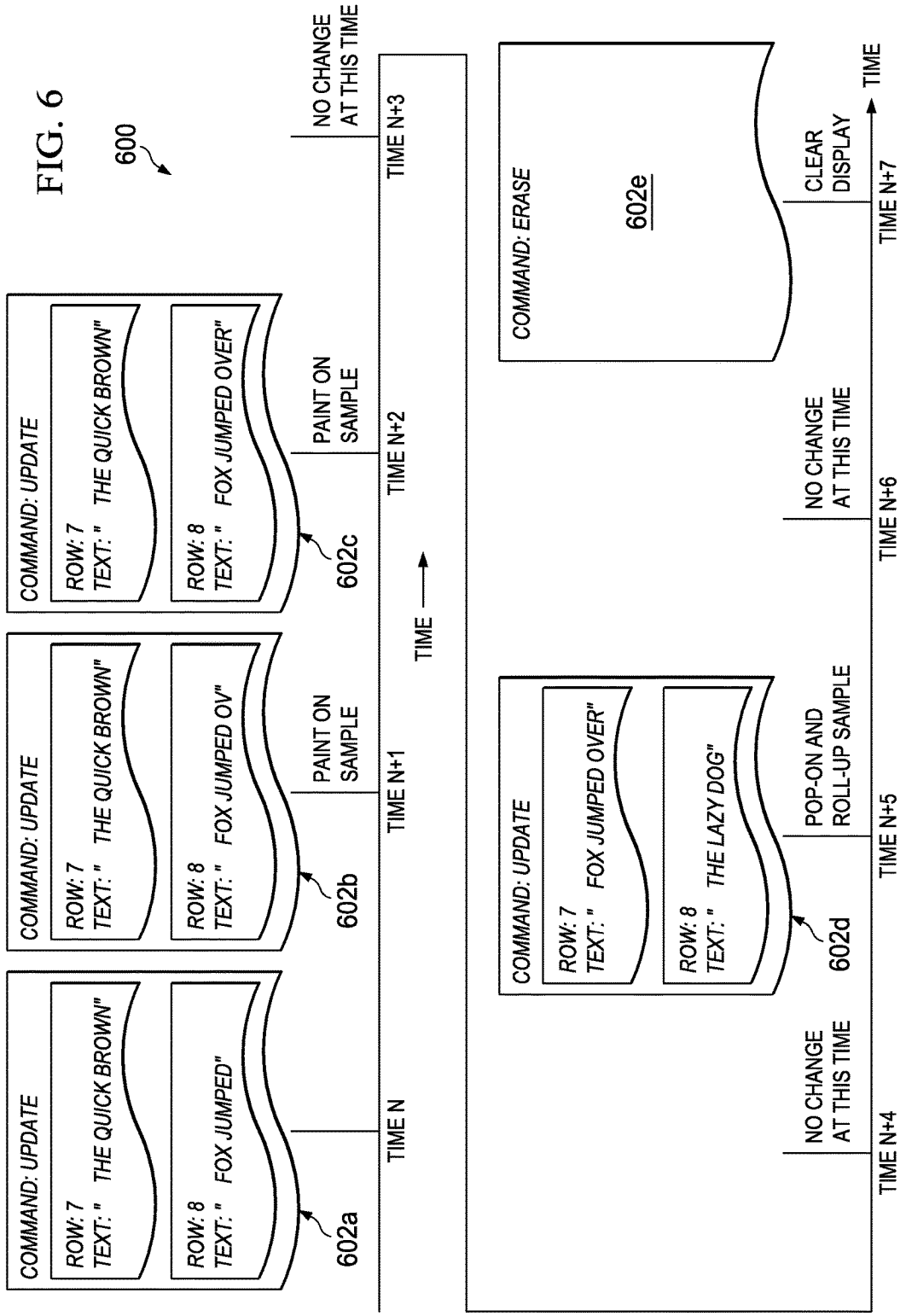
FIG. 6 illustrates an example timeline of caption data documents generated by an embodiment of the operations of FIG. 3.

Referring now to FIG. 6, FIG. 6 illustrates an example timeline 600 of caption data documents generated by an embodiment of the operations of FIG. 3. At Time N, a caption data document 602a is generated having a command field value of "Update", row text "The quick brown" on row 7, and the row text "fox jumped" on row 8. At Time N+1 the characters "ov" were added to the end of row 8 in an example of paint-on captioning. Accordingly, a caption data document 602b is generated having a command field value of "Update", row text "The quick brown" on row 7, and the row text "fox jumped ov" on row 8. At Time N+2 the characters "er" were added to the end of row 8 in an example of paint-on captioning. Accordingly, a caption data document 602c is generated having a command field value of "Update", row text "The quick brown" on row 7, and the row text "fox jumped over" on row 8. At Time N+3, nothing has changed in the visual representation and, as a result, no new caption data document is generated. At Time N+4, still nothing has changed in the visual representation and again no new caption data document is generated. At time N+5, a caption data document 602d is generated having a command field value "Update", row text "fox jumped over" on row 7, and row text "the lazy dog." on row 8 in an example of roll-up captioning (the previous row 8 has rolled up to row 7) and pop-on (multiple characters have popped onto row 8). At Time N+6, nothing has changed in the visual representation and no new caption data document is generated. At Time N+7 the on-screen representation has been cleared and accordingly a caption data document 602e is generated having a command field value of "Erase" which caused the display to be cleared.

Referring now to FIG. 7, FIG. 7 is a simplified flowchart 700 illustrating example operations of generating an optimized list of display elements from one or more caption data documents in accordance with a second processing phase of various embodiments. One function of the second phase of processing is to create and maintain an optimized list of display elements from the incoming caption data documents generated by the first phase. Each of the display elements within the list of display elements includes one or more display element rows containing textual data from the row data from the caption data document and an associated display time. In a particular embodiment, the display time of a display element may include a start time and end time associated with the display element. Several results which are achieved in at least one embodiment of this phase include: (1) assigning and preserving a unique identifier for individual, unchanged lines of text; (2) ensuring a maximum display time a given display element may be displayed; (3) preserving existing or previous text across multiple display elements assuming that no updates are desired; and (4) allowing the display to be cleared via command. As part of the processing, in at least one embodiment a row identifier (ID) value is assigned and maintained for each row of text in a display element, which is used later in one or more TTML documents generated in the third phase of processing. In a particular embodiment, an initial row ID value, such as a value of 0, may be preset. At the start of processing the display element list is initially set to empty.

In 702, a caption data document and associated time stamp is received. In 704, it is determined whether the display list is empty. If the display list is not empty, in 706 the end time stamp of the last display element in the display element list is truncated to the current time stamp and procedure 700 continues to 708. If it is determined in 704 that the display element list is empty, procedure 700 continues to step 708. Accordingly, when a new caption data document is received, whether it is merely a command (i.e. clear) or contains text rows, if the display element list is not empty, then the last display element's end time stamp is truncated to the current time stamp so that the ordering and continuity of the caption data is preserved in time.

In 708, it is determined whether the caption data document includes text data. If the caption data document does not contain text, procedure 700 ends with no new display element having been created. If it is determined that the caption data document includes text data, procedure 700 continues to 710. In 710, it is determined whether the caption data document contains a command of either Erase or Update. If the command document does not contain an Erase or Update command, procedure 700 continues to 712. In 712, any existing row text and associated row identifier (ID) are copied from the previous display element to the new display element and procedure 700 continues to 714. Accordingly, if a new caption data document is received, truncating the display time of the last element, it is presumed that any text contained in the previous display element is to be preserved in the new display element containing the new caption data. After the copy of the previous display element into the new display element takes place, any text rows contained in the new caption data document will overwrite any existing rows. However, if it is determined in 710 that either the update or clear commands are present in the new caption data document, then the copy is not performed and procedure 700 continues to 714.

Assume an example in which the last display element contains row 13 having text "the quick brown fox" and row 14 having text "jumps over the". A new caption data document is received with only row 14 having the text "jumps over the lazy dog." and neither a clear or update command is set. The new display element in this example will contain line 13 having the row text "the quick brown fox" and line 14 having the row text "jumps over the lazy dog."

In 714, any new rows of text from the caption data document are copied from the caption data document to the new display element. In 716, it is determined whether the row text of a given row matches the same row text of the previous display element. If the text of a given row matches the same row text of the previous display element, the row ID of the previous display element is reused for the new display element in 718. If the text of a given row does not match the same row text of the previous display element, the row ID is incremented and assigned to the row for the new display element in 720 to indicate that the text for this row is now different. This logic ensures that for a given string assigned to a given row within one or more display elements the identifier will be preserved across multiple display elements and TTML documents. This makes the job of the client player easier by maintaining context. From 718 or 720, procedure 700 continues to 722.

In 722, the new display element is added to the display element list and the procedure ends for this particular caption data document and associated time stamp. However, it should be understood that procedure 700 may be repeated for each received caption data document. In at least one embodiment, a predetermined maximum time-to-live (TTL) value may be used which indicates the maximum time for which a given display element list is to be maintained. At the expiry of the maximum TTL, a new empty display element list will be generated and used in the processing of subsequently received caption data documents. In a particular embodiment, a maximum TTL value of 20 seconds may be set.

Figure 8:
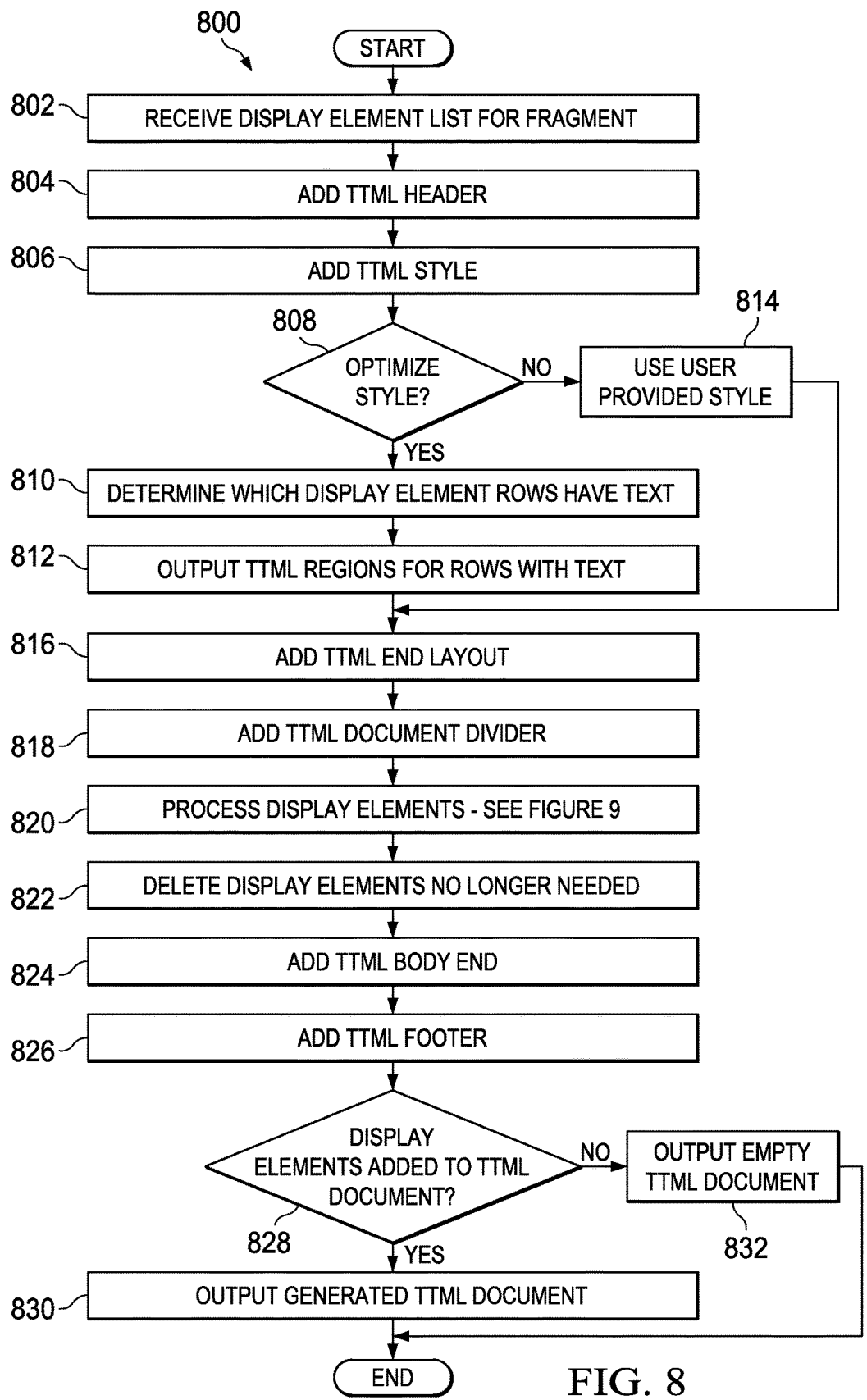
FIG. 8 is a simplified flowchart illustrating example operations of generating a TTML document from a display element list in accordance with a third processing phase of various embodiments.

Referring now to FIG. 8, FIG. 8 is a simplified flowchart 800 illustrating example operations of generating a TTML document from a display element list in accordance with a third processing phase of various embodiments. The third phase of timed text processing consists of the generation of a TTML document. On a periodic basis, for example every two seconds, a TTML document is created which accurately and efficiently reflects the display element(s), if any, which correspond to that period in time. Any elements which end before or start after the current TTML document are not included in the TTML document. Major features of at least one embodiment of the TTML document generator include: (1) containment of display elements which fall within the document display window of time; (2) optional user override of document style; (3) dynamic header generation that is optimized for included content; and (4) dynamic document body generation optimized to eliminate duplicate row entries by extending the display duration of unique row IDs across multiple display elements.

In 802, a display element list for the current fragment is received. A fragment is defined as beginning at a time TS and ending at a time TS+Duration in which Duration is a predetermined value. Accordingly, during the TTML document generation procedure a TTML document is generated from display elements having a display time within in the predetermined time period of time TS and the time TS+Duration, wherein the value of Duration is a predetermined time offset value. In a particular embodiment, the Duration value is two seconds. In 804, a TTML Document Header is added to the TTML document. In 806, a TTML Style Header is added to the TTML document. In 808, it is determined whether the Style of the TTML document should be optimized using a dynamically-generated layout. In at least one embodiment, the TTML document generator uses a standard layout, font, and color scheme for subtitles and captions. However, particular embodiments also provide a mechanism by which a user may override this style setting. As each TTML document is generated, the header includes either the optimized dynamically-generated layout or the user-provided style.

If the user does not override the document style optimization in 808, the procedure 800 continues to 810 in which the generator determines which display elements rows in the display element list have text and therefore will be present in the TTML document. In 812, the generator outputs TTML regions for rows with text such that the TTML document will only include the necessary style elements for these particular rows. Additionally, the placement and size of the row elements may vary depending on whether the generator is configured to generate subtitles or captions. The procedure 800 then continues to 816.

If the user does override the document style optimization in 808, the procedure continues to 814 in which a user provided style is used for the TTML document. The procedure 800 then continues to 816.

In 816, a TTML End Layout is added to the TTML document. In 818, a TTML Document Divider is added to the TTML document. In 820, a procedure for processing the display elements is initiated as with be further described with respect to FIG. 9.

Figure 9:
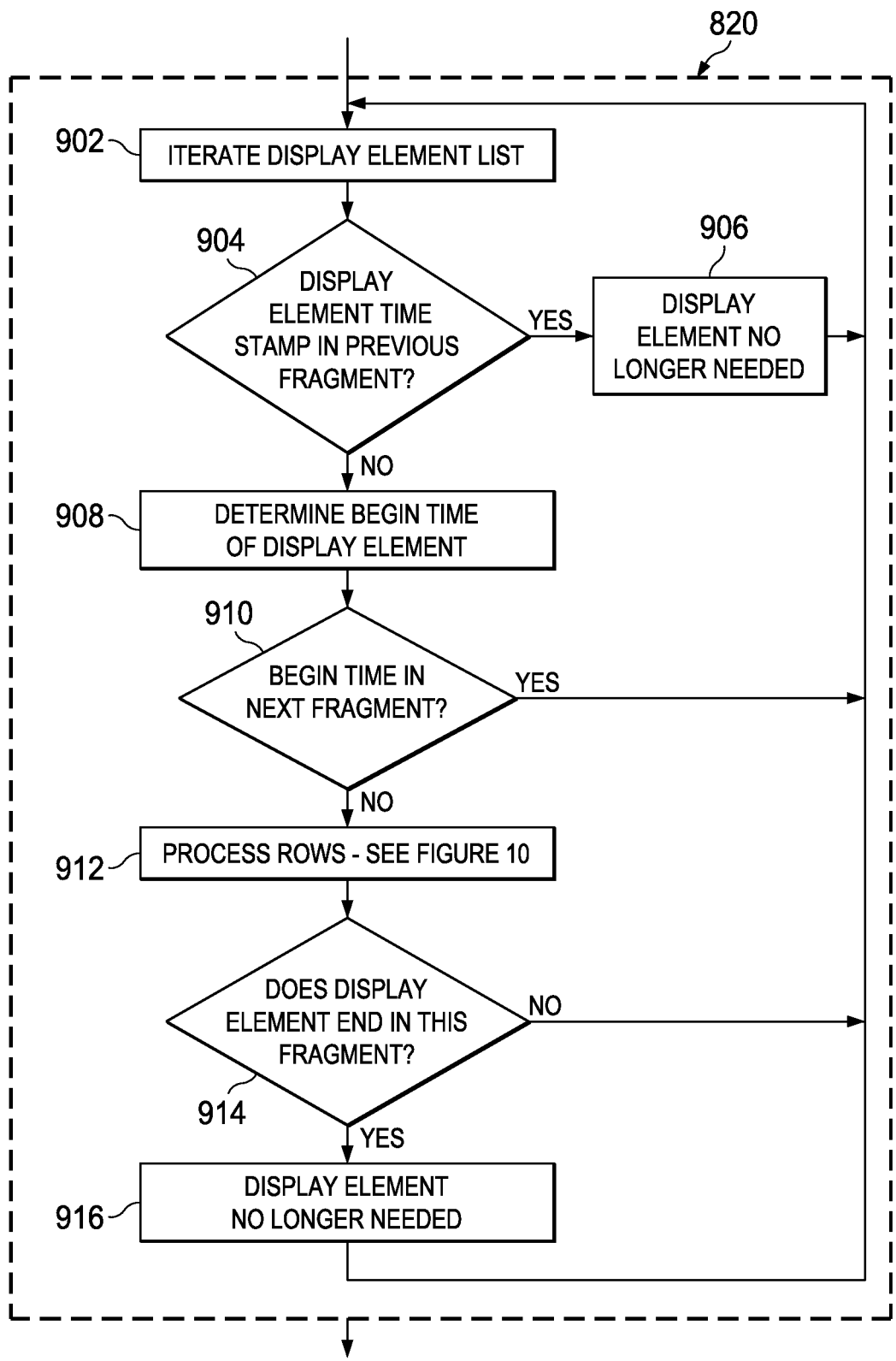
FIG. 9 illustrates an embodiment of a procedure for processing the display elements.

Referring now to FIG. 9, FIG. 9 illustrates an embodiment of a procedure 820 for processing the display elements. In 902, the display element list is iterated such that each display element in the display element list is processed as further described below. In 904, it is determined whether the time stamp of the current display element is in a previous fragment. If the time stamp of the current display element is in a previous display element, the procedure 820 continues to 906 in which it is determined that the current display element is no longer needed and can be deleted from the display element list. The procedure then returns to 902 for processing of the next display element in the iterated display element list.

If it is determined in 904, that the time stamp of the current display element is not in the previous fragment, the processing continues to 908. In 908, a begin time of the display element is determined. In a particular embodiment, the begin time of the display element is based upon a time offset between the start time associated with the TTML document and a beginning display time associated with the display element. In 910, it is determined whether the begin time of the display element is within the next fragment. If it is determined in 910 that the begin time is in the next fragment, the procedure returns to 902 in which the next display element within the display element list is processed. If it is determined in 910 that the begin time of the display element is not in the next fragment, the procedure continues to 912. In 912, a procedure for processing the rows of the display element is initiated as will be further described with respect to FIG. 10.

Figure 10:
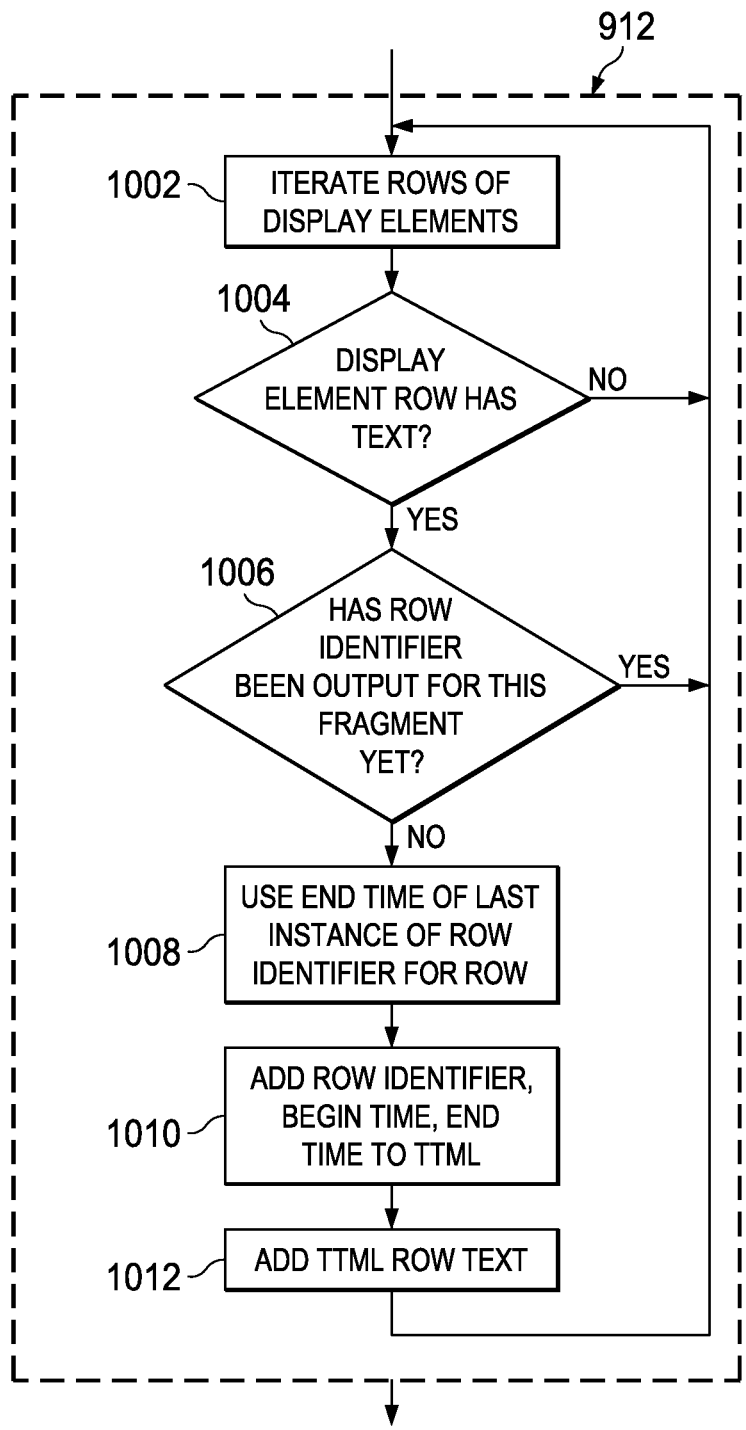
FIG. 10 illustrates an embodiment of a procedure for processing the rows of a display element.

Referring now to FIG. 10, FIG. 10 illustrates an embodiment of a procedure 912 for processing the rows of a display element. Due to the nature of identical rows being duplicated across multiple display elements, this can result in very large TTML documents. This is especially true for timed text with paint on captions. In various embodiments, the TTML document generator leverages the unique row identifier (xmlID) to optimize the size of the generated TTML documents by intelligently extending the display end time of rows within the TTML document according to their overall on-screen display time, and avoiding repeating the exact same line within the same TTML document.

In 1002, the rows of the display element are iterated so that each of the rows may be processed individually by the procedure 912. In 1004, it is determined whether the current row of the display element contains text. If it is determined in 1004 that the current row does not contain text, the current row is skipped and the procedure returns to 1002 for processing of the next row of the display element. If it is determined in 1004 that the current row does contain text, the procedure continues to 1006. In 1006, it is determined whether the current row ID has been output for this fragment yet. If it is determined that the row ID has been output for this fragment, the procedure returns to 1002. If it is determined that the row ID has not been output for this fragment, the procedure continues to 1008.

In 1008, the end time of the last instance of the row ID for the row is used to avoid duplication of a row within the fragment. In 1010, the row ID, begin time of the row, and end time of the row is added to the TTML document. In 1012, the row text associated with the row is added to the TTML document. If there are still rows to be processed within the display element, the procedure returns to 1002. However, if there are no longer any rows to be processed within the display element, the procedure continues to 912 of FIG. 9.

Referring again to FIG. 9, after 912, the procedure continues to 914 in which it is determined whether the display element ends in the current fragment. If the display element does not end in the current fragment, the procedure returns to 902 for processing of the next display element in the iterated display element list. If the display element does end in the current fragment, the procedure continues to 916. In 916, it is determined that the current display element is no longer needed and can be deleted from the display element list. The procedure then returns to 902 for processing of the next display element in the iterated display element list. Once all of the display elements in the iterated display element list have been processed, the procedure continues to 822 of FIG. 8.

Referring again to FIG. 8, in 822 display elements that are no longer needed are deleted. In 824, a TTML Body End is added to the TTML document. In 826, a TTML Footer is added to the TTML document. In 828, it is determined whether any display elements were added to the TTML document as a result of the processing. If it is determined in 828 that display elements were added to the TTML document, the procedure 800 continues to 830 in which the generated TTML document is output and the procedure 800 ends. If it is determined in 828 that display elements were not added to the TTML document, the procedure 800 continues to 832 in which an empty TTML document is output and the procedure 800 ends.

At the end of the third phase of processing, the resulting one or more TTML documents may be stored within the storage device 106 discussed with respect to FIG. 1 and subsequently transmitted by broadcast server 104 along with associated media content to network(s) 112. The media content and associated TTML document may then be received by receiver 114. Timed text decoder 116 may be further configured to decode TTML document(s) to generate timed text, and display device 118 may be configured to display the media content and associated timed text such as one or more captions and/or subtitles associated with the media content.

Although various embodiments are described with respect to the generation of TTML documents, it should be understood that other embodiments may use any type of markup language document suitable for timed text. For example, it is imperative to note that the present disclosure is not TTML specific. WebVTT is another W3C and, hence, the discussions provided here can readily apply to WebVTT representations, as well as TTML.

Note that in terms of the infrastructure of the present disclosure, any number of networks can be used to deliver a media stream containing media content and associated timed text to a viewer. The term 'media stream', as used herein, includes any type of packet exchange, which may be related to any type of video, audio-visual, voice, media, script data, or any type of source or object code, or any other suitable information in any appropriate format that may be communicated from one point to another in the network. This can include routine network communications, unicast communications, point-to-point communications, multicast communications, any type of streaming content, or any other suitable network communication in which an error may be discovered. Moreover, the network infrastructure can offer a communicative interface between content sources, endpoint devices, and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Such networks may implement a UDP/IP connection and use a TCP/IP communication language protocol in particular embodiments of the present disclosure. Further, such networks may implement any other suitable communication protocol for transmitting and receiving data packets within the architecture. Data, as used herein in this document, refers to any type of numeric, voice, video, media, or script data, or any type of source or object code, or any other suitable information in any appropriate format that may be communicated from one point to another.

Note that in certain example implementations, the timed text processing and generation functions outlined herein may be implemented in logic encoded in one or more non-transitory, tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store code (e.g., software, logic, processor instructions, etc.) that can be executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two or more devices, systems, subsystems, or elements. However, this has been done for purposes of clarity and example only. In certain cases, it may be easier to describe one or more of the functionalities of a given set of flows by only referencing a limited number of elements. It should be appreciated that the architectures discussed herein (and their teachings) are readily scalable and can accommodate a large number of components, as well as more complicated/sophisticated arrangements and configurations. Accordingly, the examples provided should not limit the scope or inhibit the broad teachings of the architectures discussed herein as potentially applied to a myriad of other architectures.

It is also important to note that the steps in the preceding flow diagrams illustrate only some of the possible signaling scenarios and patterns that may be executed by, or within, the architectures discussed herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the architectures discussed herein in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, the architectures discussed herein may be applicable to other protocols and arrangements. Moreover, the present disclosure is equally applicable to various technologies, as these have only been offered for purposes of discussion. Along similar lines, the architectures discussed herein can be extended to any communications involving network elements, where the present disclosure is explicitly not confined to unicasting and multicasting activities.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving source timed text data and an associated time stamp;
   rendering a representation of the received source timed text data within a textual array, the textual array including at least one row having textual data contained therein;
   producing at least one data document including row data and a command field, when the textual data of the at least one row has changed from a previously rendered representation of previously received source timed text data, a value of the command field indicating a screen update or a screen erase, the row data including a change in textual data for the at least one row from a previously produced caption data document;
   creating at least one display element based on the command field, the at least one display element including one or more display element rows containing textual data from the row data of the at least one data document, wherein the at least one display element includes an associated display time;
   assigning a row identifier for each row of the at least one display element, wherein the row identifier is the same as a row identifier of a previous display element when textual data of the row of the at least one display element matches textual data of a corresponding row of the previous display element;
   generating a markup language document from the at least one display element, the markup language document including the textual data of the one or more display element rows;
   determining whether a current row identifier has been output for a current fragment in response to a determination that a begin time of the at least one display element is not within a next fragment; and
   transmitting media content and the markup language document.

2. The method of claim 1, wherein the creating the at least one display element includes copying textual data from a previous display element to the at least one display element when a value of a command field of at least one data document is not indicative of either a screen update or a screen erase.

3. The method of claim 1, wherein the markup language document includes the textual data of the one or more display element rows having display times within a predetermined time period.

4. The method of claim 3, wherein the predetermined time period is between a time identified by the associated time stamp and a predetermined time offset value.

5. The method of claim 3, wherein the markup language document includes textual data only of rows having a row identifier that has not previously been outputting during the predetermined time period.

6. Logic encoded in non-transitory tangible media that includes code for execution and, when executed by a processor, operable to perform operations comprising:
receiving source timed text data and an associated time stamp;
rendering a representation of the received source timed text data within a textual array, the textual array including at least one row having textual data contained therein;
producing at least one data document including row data and a command field, when the textual data of the at least one row has changed from a previously rendered representation of previously received source timed text data, a value of the command field indicating a screen update or a screen erase, the row data including a change in textual data for the at least one row from a previously produced caption data document;
creating at least one display element based on the command field, the at least one display element including one or more display element rows containing textual data from the row data of the at least one data document, wherein the at least one display element includes an associated display time;
assigning a row identifier for each row of the at least one display element, wherein the row identifier is the same as a row identifier of a previous display element when textual data of the row of the at least one display element matches textual data of a corresponding row of the previous display element;
generating a markup language document from the at least one display element, the markup language document including the textual data of the one or more display element rows;
determining whether a current row identifier has been output for a current fragment in response to a determination that a begin time of the at least one display element is not within a next fragment; and
transmitting media content and the markup language document.

7. The logic of claim 6, wherein the creating the at least one display element includes copying textual data from a previous display element to the at least one display element when a value of a command field of at least one data document is not indicative of either a screen update or a screen erase.

8. The logic of claim 6, wherein the markup language document includes the textual data of the one or more display element rows having display times within a predetermined time period.

9. The logic of claim 8, wherein the predetermined time period is between a time identified by the associated time stamp and a predetermined time offset value.

10. The logic of claim 8, wherein the markup language document includes textual data only of rows having a row identifier that has not previously been outputting during the predetermined time period.

11. An apparatus, comprising:
a memory element;
a processor operable to execute instructions associated with electronic code; and
a timed text generator module;
the apparatus configured to
receive source timed text data and an associated time stamp;
render a representation of the received source timed text data within a textual array, the textual array including at least one row having textual data contained therein;
produce at least one data document including row data and a command field, when the textual data of the at least one row has changed from a previously rendered representation of previously received source timed text data, a value of the command field indicating a screen update command or a screen erase command, the row data including a change in textual data for the at least one row from a previously produced caption data document,
create at least one display element based on the command field, the at least one display element including one or more display element rows containing textual data from the row data of the at least one data document, wherein the at least one display element includes an associated display time;
assign a row identifier for each row of the at least one display element, wherein the row identifier is the same as a row identifier of a previous display element when textual data of the row of the at least one display element matches textual data of a corresponding row of the previous display element;
generate a markup language document from the at least one display element, the markup language document including the textual data of the one or more display element rows;
determine whether a current row identifier has been output for a current fragment in response to a determination that a begin time of the at least one display element is not within a next fragment; and
transmit media content and the markup language document.

12. The apparatus of claim 11, wherein the apparatus is further configured to copy textual data from a previous display element to the at least one display element when a value of a command field of at least one data document is not indicative of either a screen update or a screen erase.

13. The apparatus of claim 11, wherein the markup language document includes the textual data of the one or more display element rows having display times within a predetermined time period.

14. The apparatus of claim 13, wherein the markup language document includes textual data only of rows having a row identifier that has not previously been outputting during the predetermined time period.

15. The method of claim 1, further comprising:
adding the current row identifier and a begin time and an end time of a row to the markup language document in response to a determination that the current row identifier has not been output for the current fragment.

16. The logic of claim 6, the operations further comprising:
adding the current row identifier and a begin time and an end time of a row to the markup language document in response to a determination that the current row identifier has not been output for the current fragment.

17. The apparatus of claim 11, wherein the apparatus is further configured to add the current row identifier and a begin time and an end time of a row to the markup language document in response to a determination that the current row identifier has not been output for the current fragment.

* * * * *